(12) United States Patent
Yao

(10) Patent No.: US 8,830,520 B2
(45) Date of Patent: Sep. 9, 2014

(54) SYSTEM AND METHOD FOR ENHANCING THE DENSITY OF BLACK

(75) Inventor: Meng Yao, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 960 days.

(21) Appl. No.: 12/884,311

(22) Filed: Sep. 17, 2010

(65) Prior Publication Data

US 2012/0069357 A1   Mar. 22, 2012

(51) Int. Cl.
   *B41B 15/00* (2006.01)
   *H04N 1/407* (2006.01)
   *H04N 1/60* (2006.01)

(52) U.S. Cl.
   CPC ............. *H04N 1/407* (2013.01); *H04N 1/6022* (2013.01)
   USPC .......... 358/1.9; 358/1.15; 358/1.16; 358/518; 358/523

(58) Field of Classification Search
   None
   See application file for complete search history.

(56) References Cited

U.S. PATENT DOCUMENTS

| | | | |
|---|---|---|---|
| 5,784,049 A | 7/1998 | Hall | |
| 6,118,548 A * | 9/2000 | Ryan | 358/1.9 |
| 6,122,407 A | 9/2000 | Peters | |
| 6,183,062 B1 * | 2/2001 | Curtis et al. | 347/41 |
| 6,290,330 B1 | 9/2001 | Torpey et al. | |
| 6,871,928 B1 | 3/2005 | Kroon | |

* cited by examiner

*Primary Examiner* — Benny Q Tieu
*Assistant Examiner* — Michael Y Tzeng
(74) *Attorney, Agent, or Firm* — Fay Sharpe LLP

(57) ABSTRACT

A computer-implemented method and system for enhancing black density of a halftoned bitmap are provided. The method includes receiving a halftoned bitmap into computer memory, and, using a computer, identifying at least one black-only pixel in the halftoned bitmap. The method further includes for each of the identified black-only pixels, identifying at least one black-only pixel as a candidate for adding color based at least in part on the location of the black-only pixel with respect to an edge in the halftoned bitmap, modifying the halftoned bitmap by adding color to at least one of the candidate black-only pixels, and outputting the modified halftoned bitmap.

12 Claims, 8 Drawing Sheets

BLACK PIXEL

SYSTEM AND METHOD FOR ENHANCING THE DENSITY OF BLACK

BACKGROUND

The exemplary embodiment relates to a system and method for enhancing the density of black on images to be printed on color printers.

Color printers typically employ a plurality of inks of different primary colors to generate a spectrum of colors. For example, many color printers use four ink colors: cyan (C), magenta (M), yellow (Y), and black (K). Color images are formed on a receiving substrate or medium by placing combinations of zero or more dots of C, M, Y or K ink at each pixel location.

It is common for the black density produced by some color printers to be less than optimal, causing black to appear as a dark gray. Previous methods for correcting the black density of printed documents involve adding color to individual pixels, but are either too complicated or do not allow for explicit control over how far the added color pixels are from a black edge. Adding color to pixels close to the black edge may result in color fringes at the black edge depending on the degree of color misregistration.

Accordingly, it is desirable to have a less complicated method and system for correcting black density by adding color to pixels that allows for control over the relative location of the added color pixels.

BRIEF DESCRIPTION

In one aspect of the exemplary embodiment, a computer-implemented method for enhancing the black density of a halftoned bitmap is provided. The method includes receiving a halftoned bitmap into computer memory, and, using a computer, identifying at least one black-only pixel in the halftoned bitmap. The method further includes for each of the identified black-only pixels, identifying at least one black-only pixel as a candidate for adding color based at least in part on the location of the black-only pixel with respect to an edge in the halftoned bitmap, modifying the halftoned bitmap by adding color to at least one of the candidate black-only pixels, and outputting the modified halftoned bitmap.

In another aspect, a computer-based system for enhancing the black density of a halftoned bitmap is provided. The system includes a computer processor and computer memory which stores an edge detection module, a neighboring color pixel detection module, and a pixel coloring module. The edge detection module is configured to receive a halftoned bitmap, and for each of a plurality of black-only pixels in the halftoned bitmap, determine whether the black-only pixel is within a first distance from an edge within the halftoned bitmap. The neighboring color pixel detection module is configured to, for each of a plurality of black-only pixels in the halftoned bitmap, determine whether the black-only pixel is within a second distance from at least one color pixel in the halftoned bitmap. The pixel coloring module is configured to determine whether to add color to at least one black-only pixel based at least in part on the determinations from the edge detection module and neighboring color pixel detection module, modify the halftoned bitmap by adding color to the black-only pixels based on the determination made by the pixel color module, and output the modified halftoned bitmap.

In yet another aspect, a computer program product comprising tangible media encoding instructions which, when executed on a computer, perform a method is provided. The method of the computer program product includes receiving a halftoned bitmap into computer memory, identifying at least one black-only pixel in the halftoned bitmap, for each of the identified black-only pixels, identifying at least one black-only pixel as a candidate for adding color based at least in part on the location of the black-only pixel with respect to an edge in the halftoned bitmap, modifying the halftoned bitmap by adding color to at least one of the candidate black-only pixels, and outputting the modified halftoned bitmap.

DETAILED DESCRIPTION

Disclosed herein are a method and system for enhancing the density of black on images to be printed. The exemplary method and system operate on halftoned bitmaps representing a document or image to be printed. As used herein, the term bitmap implies one bit per pixel. Halftone prints (e.g., halftoned bitmaps) can be produced from bi-level images that indicate the presence or absence of ink at a particular location within the image. A halftone image file can be viewed as a bitmap. Each bit is used to indicate whether a pixel is on or off. Color halftone printing devices make use of different channels, e.g., Cyan (C), Magenta (M), Yellow (Y), and Black (K), to define colors. Thus, color halftone prints may include a plurality of monochromatic bitmaps.

At a high level, for each black-only pixel of the halftoned bitmap, the exemplary method and system determines whether the black pixel is near an edge, or if the black pixel has any color pixels in its neighborhood. If the black pixel is not near an edge, and there are no neighboring color pixels (i.e., pixels containing a color other than black), the black-only pixel is identified as a candidate pixel for adding color. For each candidate pixel, if the corresponding bit in a pre-determined cyan pattern is 1, cyan is added to this black pixel. Similarly, if the corresponding bit in a pre-determined magenta/yellow pattern is 1, magenta/yellow is added to this black pixel. The pre-determined cyan, magenta and yellow patterns can be generated using the same halftone screens that were employed to generate the halftoned image data, but they could also be generated using other halftone screens. For example, the pre-determined cyan, magenta, and yellow patterns can be generated by using the cyan, magenta and yellow halftone screens to halftone the 60% cyan, 60% magenta, and 60% yellow, and the resulting halftone patterns can be used to determine whether cyan, magenta, or yellow should be added to a candidate black pixel. In this example, an area with a 100% black will have 60% cyan, magenta and yellow patterns added to it, resulting in total ink coverage of 280%.

Figure 1:
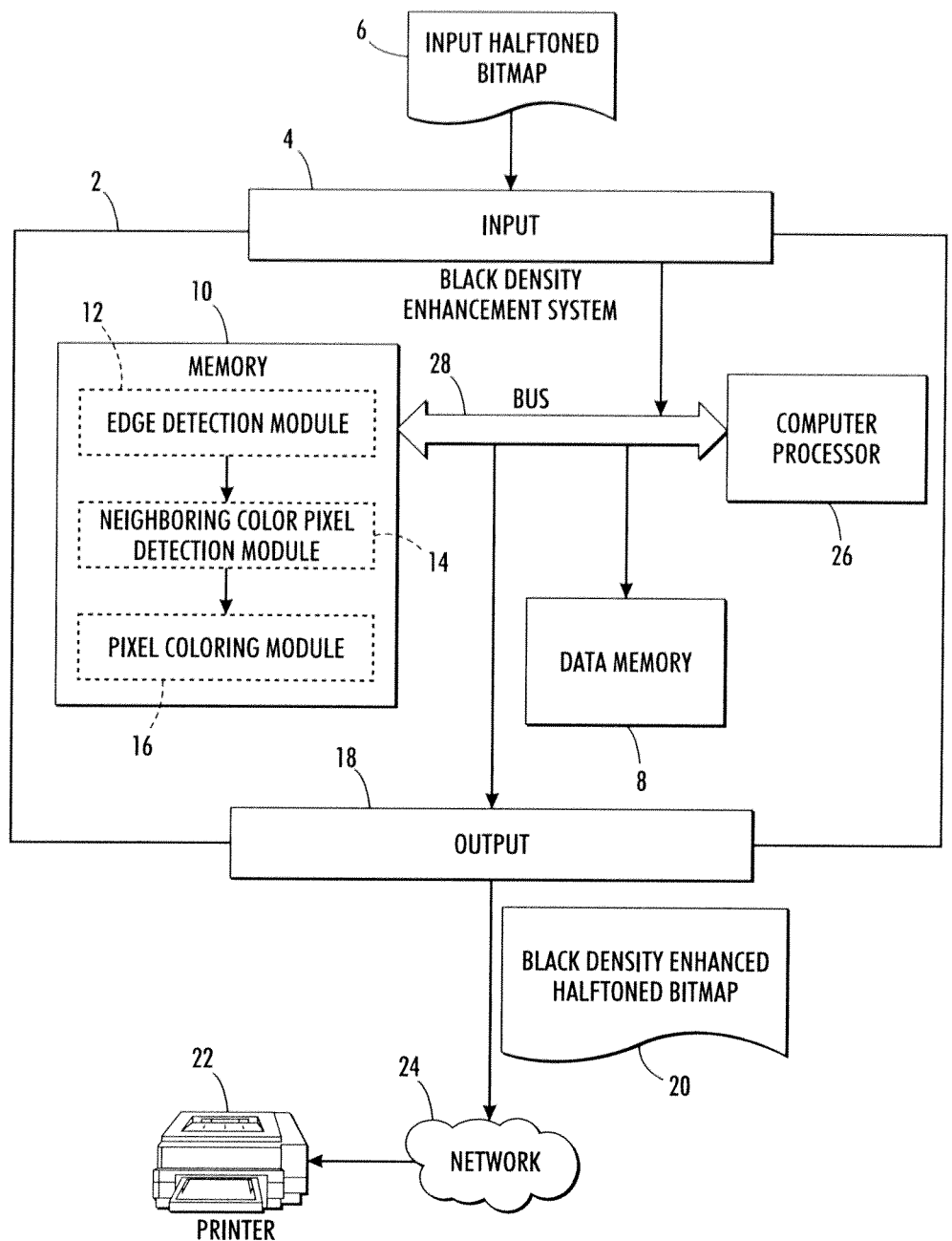
FIG. 1 is a high-level overview of an exemplary system for enhancing black density of an image to be printed on a color printer.

With reference to FIG. 1, an exemplary system 2 for enhancing the black density of an image to be printed is illustrated. The system 2 includes an input device 4 for receiving one or more halftoned bitmaps 6. Prior to inputting, the halftoned bitmap 6 may be stored in any suitable tangible media such as a ROM or RAM drive, generated by a scanner, and/or may be input into the system 2 in the form of a carrier wave, e.g., via the Internet. Alternatively, the halftoned bitmap 6 may be generated within the system 2, itself. The input device 4 may include a modem link, a wired or wireless connection, USB port, floppy or hard disk receiver, or the like and may be separated or combined with other components of the system 2.

The system 2 includes data memory 8 for storing the halftoned bitmap 6 during processing. Main memory 10 of the system 2 stores an edge detection module 12, neighboring color pixel detection module 14, and a pixel coloring module 16. Outputs from operation of modules 12, 14 and 16, such as a black density enhanced halftoned bitmap 20, may be stored in memories 8, 10 or output via an output device 18 to a device such as a printer or printing system 22, optionally through a network 24 such as the Internet.

The edge detection module 12 receives as input the halftoned bitmap 6 via the input device 4 and, for each black-only pixel in the halftoned bitmap 6, determines whether the black-only pixel is near an edge. A black pixel is near an edge if the pixel is within a certain distance from a non-black pixel. For purposes of the edge detection module 12, non-black pixels are pixels that do not contain black (K from the CMYK color model) and may have other colors such as cyan, magenta or yellow. Black pixels that are determined to be near an edge are discarded as candidates for adding color in order to avoid color fringing around edges.

The neighboring color pixel detection module 14 receives as input the halftoned bitmap 6 from the edge detection module 12 and, for each black-only pixel in the halftoned bitmap 6, determines whether the black pixel has neighboring color pixels. A black pixel has neighboring color pixels if the black pixel is within a certain (second) distance from a color pixel. The distance employed by module 14 may be different than the (first) distance employed by the edge detection module 12. For purposes of the neighboring color pixel detection module 14, a color pixel is a pixel that contains any color other than black (such as cyan, magenta or yellow), regardless of whether the pixel contains black. For example, a pixel containing black and yellow as well as a pixel containing only yellow are both considered to be color pixels. A "white" pixel (i.e., a pixel containing only off CMYK values) is not considered a color pixel because it does not contain any color. Black pixels that are determined to be near other black pixels with color already added to them, for example, through the color rendering process, are discarded from further consideration in order to avoid adding further color to the black area which may cause undesirable color mixing behavior. Discarding black pixels with color already added to them ensures that pixels containing only the color black (K from the CMYK color model) are considered candidate pixels.

The pixel coloring module 16 adds color (such as cyan, magenta or yellow) to each black pixel in the halftoned bitmap 6 that is identified as not being near an edge and as having no neighboring pixels that are non-black. The pixel coloring module 16 then outputs the modified halftoned bitmap 20 to memory 8, 10 or via output device 18 to one or more devices such as a printer 22.

In the exemplary system, the components 12, 14 and 16 comprise software instructions stored in main memory 10, which are executed by a computer and/or electronic processor 26. The processor 26, such as the computer's CPU, may control the overall operation of the computer system 2 by execution of processing instructions stored in memory 10. Components 4, 8, 10, 12, 14, 16, 18 and 26 may be connected by a data control bus 28. As will be appreciated, system 2 may include fewer or more components while still having the same functionality. For example, components 12, 14, 16 may be combined to form fewer components, or may be functionally separated to form more individual components.

As will be appreciated, the black density enhancement system 2 may comprise one or more computing devices, including but not limited to, a personal computer, PDA, laptop computer, server computer, scanning device with document/image processing capability, or a combination thereof. Memories 8, 10 may be integral or separate and may represent any type of computer readable medium such as random access memory (RAM), read only memory (ROM), magnetic disk or tape, optical disk, flash memory, or holographic memory. In one embodiment, the memories 8, 10 comprise a combination of random access memory and read only memory. In some embodiments, the processor 26 and memory 10 and/or 8 may be combined in a single chip.

Figure 2:
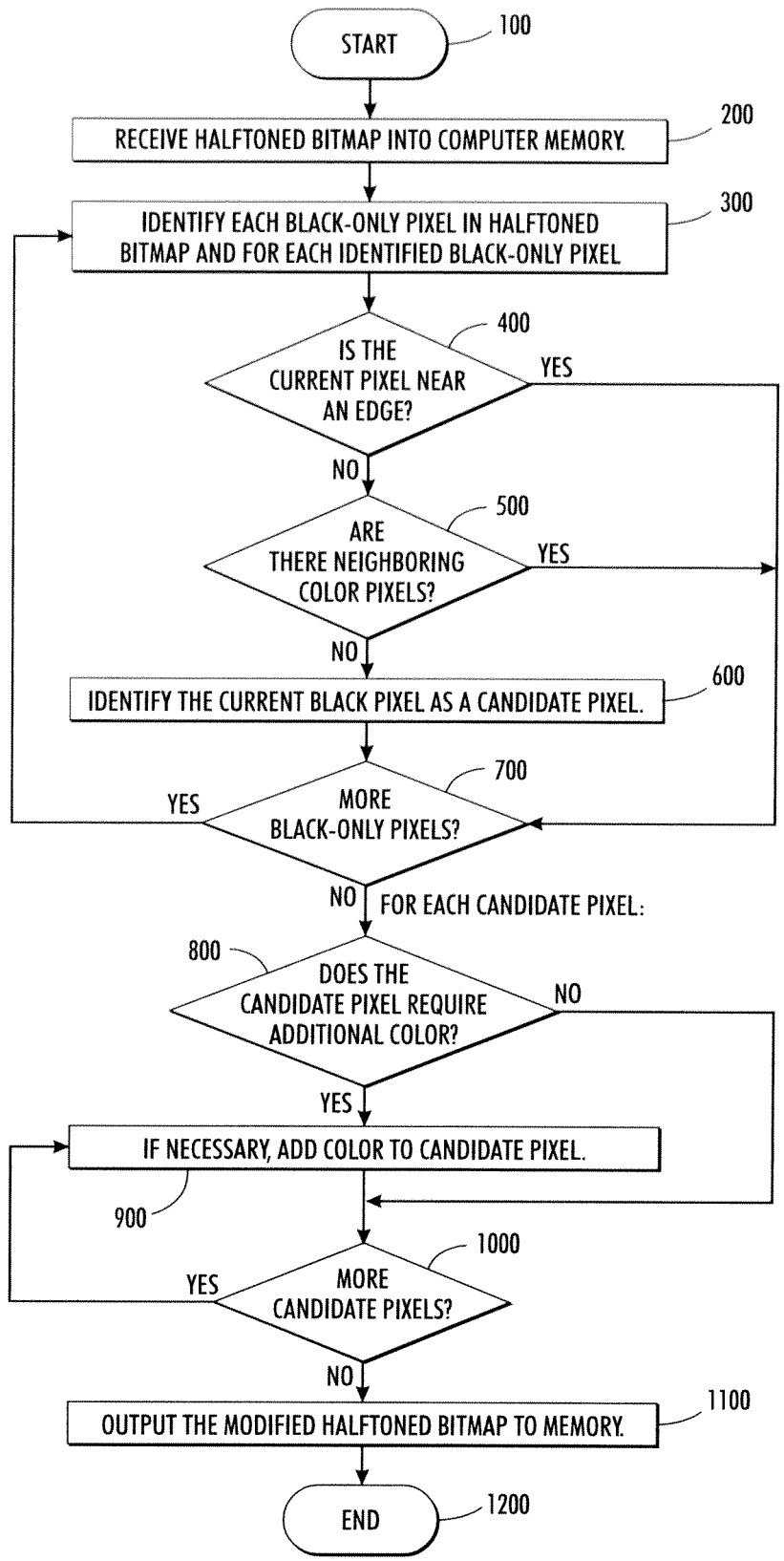
FIG. 2 is a flow diagram illustrating the operations performed by the exemplary system of FIG. 1.

With reference to FIG. 2, an exemplary method for enhancing the density of black on images to be printed is illustrated. The method may employ the system 2 illustrated in FIG. 1 or any other appropriately configured system. It is to be appreciated that the exemplary method may include fewer, more, or different steps from those shown and need not proceed in the order illustrated. The method illustrated in FIG. 2 may be implemented in a computer program product that may be executed on a computer. The computer program product may be a tangible computer-readable recording medium (such as a disk or other memory storage device) on which a control program is recorded, or may be a transmittable carrier wave in which the control program is embodied as a data signal. The illustrated method may be entirely automated or may include some user input, as noted herein.

Figure 3:
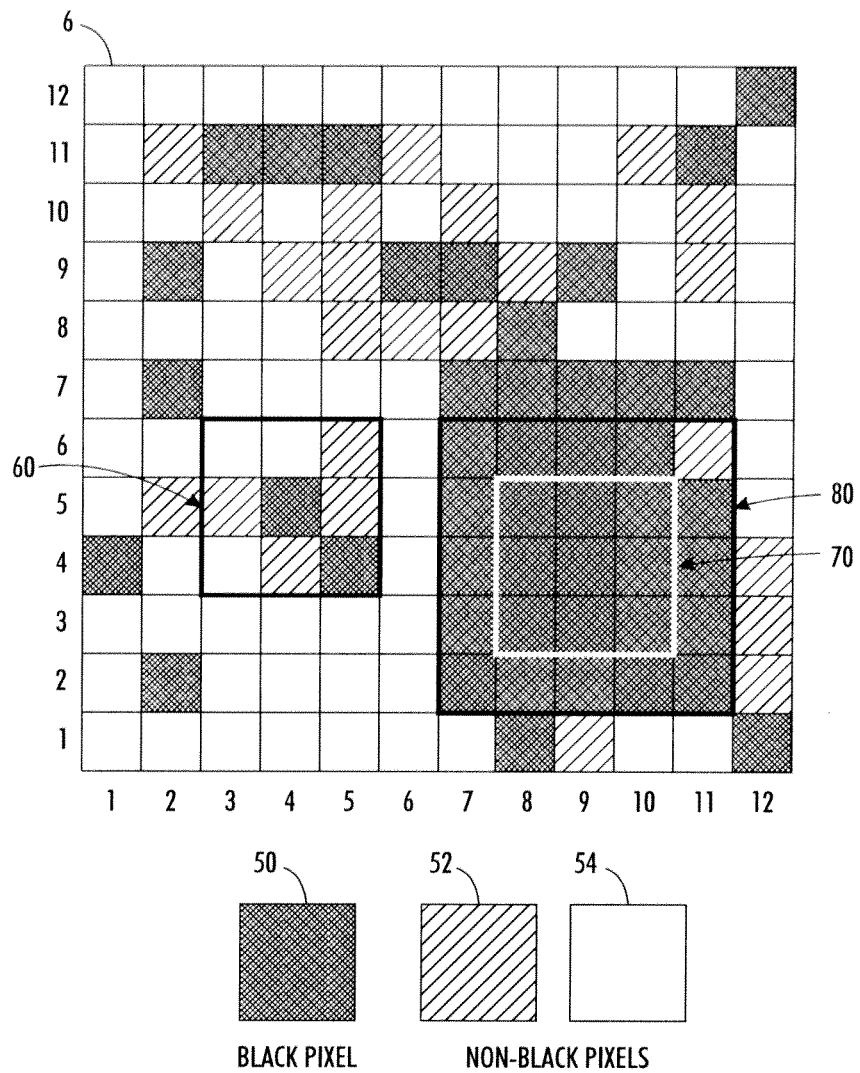
FIG. 3 graphically illustrates an example halftoned bitmap that is input into the system shown in FIG. 1.

The method begins at step 100. At step 200, the black density enhancement system 2 receives halftoned bitmap 6 and stores the halftoned bitmap 6 into memory 8 or 10 for processing. The halftoned bitmap 6 may vary in size from about 100 pixels to very large bitmaps containing millions or more pixels. For purposes of illustration, the halftoned bitmap 6 is 12×12 pixels. FIG. 3 illustrates example halftoned bitmap 6. The halftoned bitmap 6 contains an array of pixel locations that are used to define the locations on a print output medium that can be marked or printed. Each pixel location can, for example, contain (a) one or more non-black colors (e.g., cyan, magenta or yellow), (b) black by itself, (c) black and at least one non-black color, or (d) no color at all (i.e., "white"). For example, bitmap 6 contains black pixels 50, which may contain only black or colors in addition to black. Non-black pixels 52 and 54 do not contain a black component, wherein non-black pixel 52 contains at least one color (such as cyan, magenta or yellow) and non-black "white" pixel 54 contains no color. In some embodiments, the halftoned bitmap 6 includes a plurality of dots varying in size and/or spacing consisting of a plurality of adjacent black pixels.

Returning to FIG. 2 at step 300, the black density enhancement system 2 identifies all of the black-only pixels in the input halftoned bitmap 6 for later processing. The black-only pixels identified in this step contain only a black component and no other color.

At step 400, the edge detection module 12 receives the halftoned bitmap 6 and, for each black-only pixel in the halftoned bitmap 6 identified at step 300, determines whether the black-only pixel is near an edge. If the black-only pixel is determined to be near an edge, the method proceeds to step 700. Else, the method proceeds to step 500. Step 400 is illustrated in more detail with reference to FIG. 4 below.

At step 500, the neighboring color pixel detection module 14 receives as input the halftoned bitmap 6 from the edge detection module 12 and, for each black-only pixel in the halftoned bitmap 6 (identified at step 300), determines whether the black-only pixel has neighboring color pixels. FIG. 3 illustrates color pixels 52 contained in the exemplary halftoned bitmap 6. If the black-only pixel has neighboring color pixels, the method proceeds to step 700. Else, the method proceeds to step 600. Step 500 is illustrated in more detail with reference to FIG. 7 below.

At step 600, the black density enhancement system 2 identifies the current black-only pixel as a candidate pixel. Since the method has reached this step, the current black-only pixel is not near an edge and has no neighboring color pixels.

At step 700, if there are more unprocessed black-only pixels identified, then the method proceeds to step 300. Else, the method proceeds to step 800.

At step 800, the pixel coloring module 16 determines whether each candidate pixel identified at step 600 requires additional color. For the CMYK color model, the colors that may be added to a black pixel are cyan, magenta and yellow. Whether or not color will be added to a candidate black pixel depends on three pre-generated cyan, magenta and yellow patterns. The pre-generated patterns correspond to a color coverage desired for a given area of the image. For example, if it is determined that a total of 280% coverage is needed to obtain a satisfactory black density, a 60% cyan pattern, a 60% magenta pattern and a 60% yellow pattern can be added to 100% black to obtain 280% color coverage. The relative amounts of cyan, magenta and yellow can be varied to achieve a neutral color, for example, 63% cyan, 58% magenta and 59% yellow may be used to achieve neutral black while keeping the total coverage at 280%. The cyan, magenta and yellow patterns at 60% coverage can be generated using the same halftone screens that were employed to generate the halftoned image data, but they could also be generated using different halftone screens. For a candidate black pixel, if the pre-generated cyan pattern has a cyan pixel that is turned on at the same location, a cyan pixel will be added to the black pixel. Similarly, for a candidate black pixel, if the pre-generated magenta/yellow pattern has a magenta/yellow pixel that is turned on at the same location, a magenta/yellow pixel will be added to the black pixel. The amount of color coverage required to obtain the desired effect of adding density to black will vary depending on factors that include, but are not limited to, the density of pure black and toner/ink coverage limits of the printer. Any now known or later developed technique using desired color coverage parameters may be used to pre-generate the desired cyan, magenta and yellow patterns. In one embodiment, gray balancing is used to determine an appropriate color coverage so that neutral colors are rendered correctly.

At step 900, in response to the determination made at step 800, the pixel coloring module 16 adds one or more colors to the candidate black-only pixel by turning on the corresponding color at the black pixel location.

At step 1000, if there are more unprocessed candidate pixels identified at step 600, then the method proceeds to step 800. Else, the method proceeds to step 1100.

At step 1100, the black density enhancement system 2 outputs the black density enhanced halftoned bitmap 20 to memory 8 or 10, or to another output device such as printer 22 via output device 18.

The method ends at step 1200.

Figure 4:
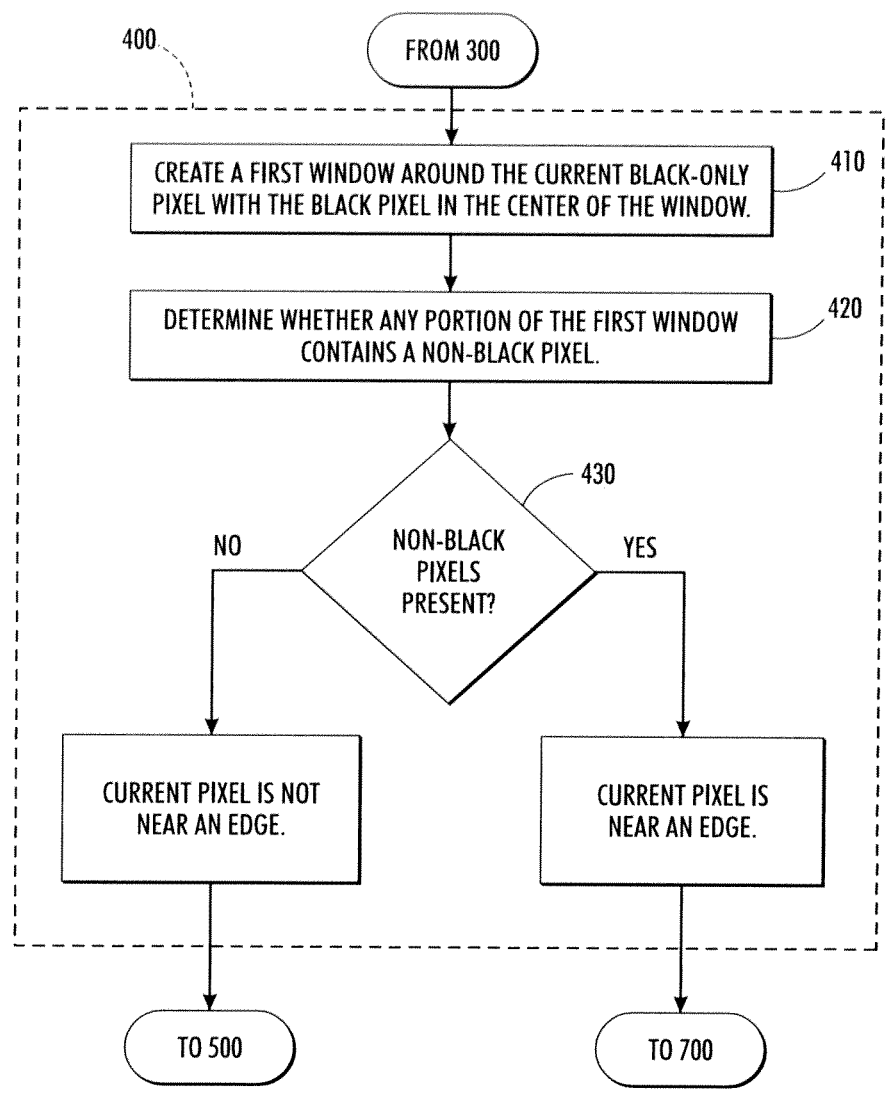
FIG. 4 is a flow diagram illustrating in more detail the method for detecting edges utilized in the method of FIG. 2.

Referring now to FIG. 4, step 400 is illustrated in more detail as applied to the example input halftoned bitmap 6 shown in FIG. 3. For explanatory purposes, it is assumed that step 400 is processing a single black pixel at a time out of a possible plurality of black-only pixels identified at step 300.

Figure 5:
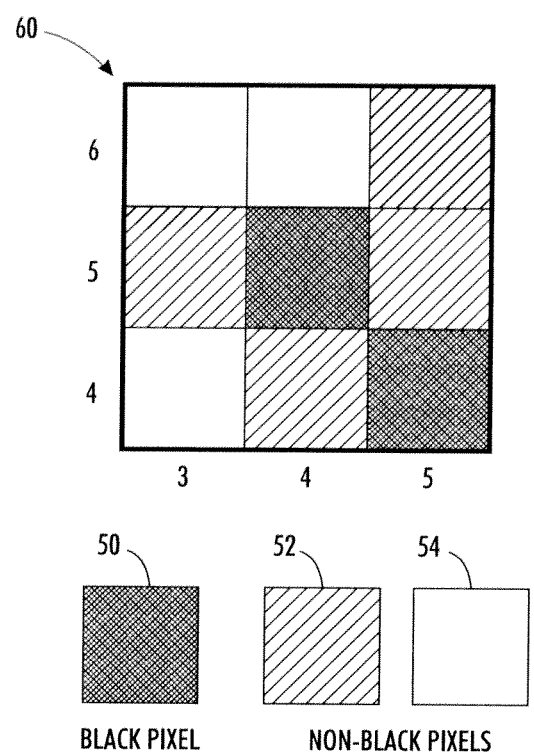
FIG. 5 is a magnified view of a first window used on the halftoned bitmap of FIG. 3.

At step 410, the edge detection module 12 creates a first window 60 (FIG. 3) centered around black-only pixel 50 (located at position (4, 5) in FIG. 3). A magnified illustration of window 60 is shown in FIG. 5. The size of the first window 60 depends on the degree of misregistration between the black and non-black color planes. Color misregistration occurs when corresponding CMYK bitmaps are not overlapped correctly. For example, if the misregistration between black and the non-black colors is 1 pixel, then the size of the first window 60 may be set to 3×3 so that any black pixels at an edge do not have color added to them which may cause color fringes due to the 1 pixel misregistration. Similarly, if the misregistration between black and the non-black colors is 2 pixels, then the size of the first window 60 may be set to 5×5. The correlation between the degree of misregistration and the size of the first window 60, 70 may vary depending on the particular application in which the exemplary method and system are embodied. Additionally, the window need not necessarily be square in shape. For example, a 5×7 window or other size may be created around the black-only pixel.

Figure 6:
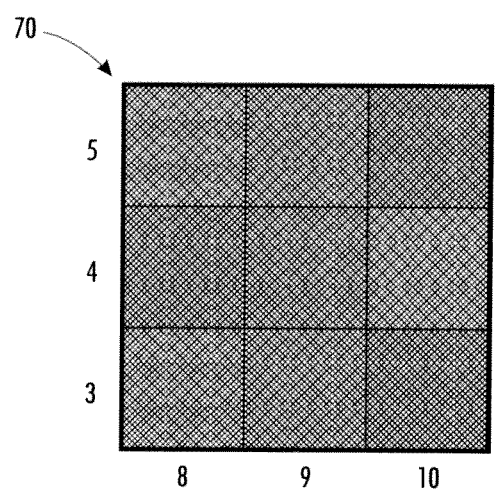
FIG. 6 is another magnified view of a first window used on the halftoned bitmap of FIG. 3.
Figure 6:
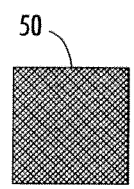

Returning to FIG. 4 at step 420, module 12 determines whether any portion of the first window 60 contains a non-black pixel. A non-black pixel is a pixel that does not contain black (K from the CMYK color model) and may contain other colors such as cyan, magenta or yellow. An example of such a pixel is non-black pixel 52 in FIGS. 3 and 5. Pixels containing no CMYK components that appear white (such as pixel 54) are considered to be non-black pixels for purposes of step 420. As shown by FIG. 5, window 60 contains multiple non-black pixels 52, 54 which are detected by the edge detection module 12. FIGS. 3 and 6 illustrate another first (3×3) window 70 containing all black pixels centered around the black-only pixel at location (9, 4). Accordingly, with respect to FIG. 6, the edge detection module 12 determines that there are no non-black pixels in first window 70.

At step 430, if the edge detection module 12 has detected one or more non-black pixels 52, 54 in the first window 60, the black pixel at the center of window 60 is eliminated as a candidate pixel and the method proceeds to step 700. Else, if no non-black pixels 52, 54 are detected, the black pixel at the center of window 60 remains a candidate and the method proceeds to step 500. This condition is imposed so that color is only added to black pixels that are not near the edge, whether it is an edge in the image or an edge of a black halftone dot.

Figure 7:
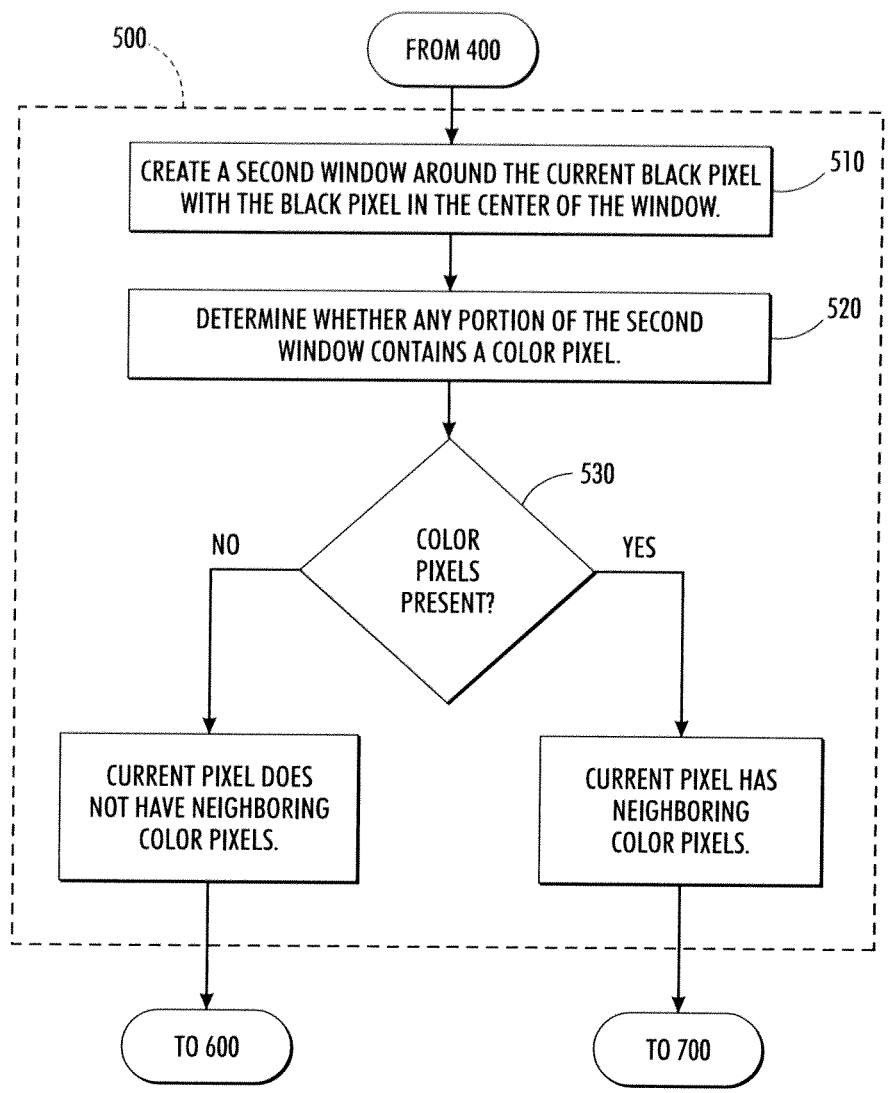
FIG. 7 is a flow diagram illustrating in more detail the method for detecting neighboring color pixels utilized in the method of FIG. 2.

Referring now to FIG. 7, step 500 is illustrated in more detail as applied to the example halftoned bitmap 6 shown in FIG. 3. In the exemplary embodiment, step 500 is performed on individual black pixels 50 that are not near an edge, as determined at step 400.

Figure 8:
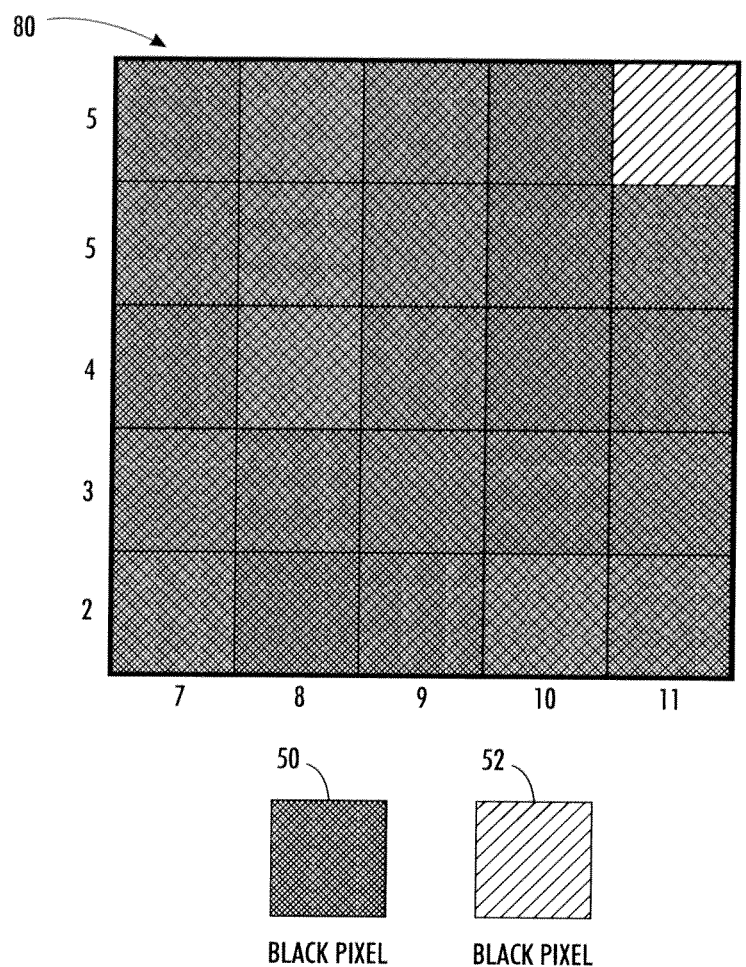
FIG. 8 is a magnified illustration of a second window used on the halftoned bitmap of FIG. 3.

At step 510, the neighboring color pixel detection module 14 creates a second window centered around the current black pixel. FIGS. 3 and 8 illustrate a second window 80 centered around the current black-only pixel 50 located at position (9, 4). Note that the current black pixel 50 was previously centered in first window 70 at step 400. The size of the second window 80 may, but is not required to, differ from the size of the first window 70, and in the exemplary method and system, the second window 80 is larger than the first window 70. The size may depend on factors such as the amount of coverage color added to any black pixels in the halftoned bitmap 6 prior to being input into the system 2. For example, if cyan was previously added to 10% of the black pixels in the input halftoned bitmap 6, then the second window 80 will be larger than if cyan was added to 50% of the black pixels. In the latter case, a smaller window is sufficient since there are more black/cyan pixels to detect within a given area. The second window is employed in order to take into consideration the possibility that some color has been added to black as part of the commonly used black generation process prior to inputting the bitmap into system 2. In such a case, no more color will be added to the black-only pixel.

At step 520, module 14 determines whether any portion of the second window 80 contains a color pixel. As noted above, a color pixel is a pixel that contains any color other than black (such as cyan, magenta or yellow), regardless of whether the pixel contains black. In this stage of the process, a "white" pixel (i.e., a pixel containing only off CMYK values) is not considered a color pixel because it does not contain any color. With respect to FIG. 8, the second window 80 contains a non-black color pixel 52 at location (11, 6).

At step 530, if the neighboring color pixel detection module 14 has detected one or more color pixels, the black-only pixel at the center of second window 80 is eliminated as a candidate pixel and the method proceeds to step 700. Else, if no color pixels are detected, the black pixel at the center of second window 80 remains a candidate for adding color and the method proceeds to step 600 as discussed in connection with FIG. 2.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for enhancing black density of a halftoned bitmap, comprising:
    receiving a halftoned bitmap into computer memory, wherein the halftoned bitmap utilizes primary colors comprising cyan, magenta, yellow and black (CMYK), and wherein each primary color of the halftoned bitmap is represented as an individual bitmap in which each primary color may be on or off for each pixel of the halftoned bitmap;
    identifying at least one black-only pixel in the halftoned bitmap;
    for each of the identified black-only pixels, identifying at least one black-only pixel as a candidate for adding color based at least in part on the location of the black-only pixel with respect to an edge in the halftoned bitmap, the identifying including:
        (i) determining whether the black-only pixel is within a first distance from an edge, including:
            (ia) creating a window centered around the black-only pixel, and
            (ib) determining whether the window encompasses a pixel with an off value for black, wherein the size of the window is determined based at least in part on a degree of misregistration; and
        (ii) determining whether the black-only pixel is within a second distance from at least one color pixel;
    modifying the halftoned bitmap by adding color to at least one of the candidate black-only pixels based at least in part on at least one pre-determined pattern; and
    outputting the modified halftoned bitmap, wherein the method is performed using a computer.

2. The method of claim 1, wherein the at least one predetermined pattern is generated using halftone screens employed in the generation of the halftone bitmap.

3. The method of claim 1, wherein the at least one predetermined pattern is generated using halftone screens not employed in the generation of the halftone bitmap.

4. The method of claim 1, wherein the modified halftoned bitmap is output to a printing system.

5. The method of claim 1, wherein the first and second distances are equal.

6. A computer-implemented method for enhancing black density of a halftoned bitmap, comprising:
    receiving a halftoned bitmap into computer memory, wherein the halftoned bitmap utilizes primary colors comprising cyan, magenta, yellow and black (CMYK), and wherein each primary color of the halftoned bitmap is represented as an individual bitmap in which each primary color may be on or off for each pixel of the halftoned bitmap;
    identifying at least one black-only pixel in the halftoned bitmap;
    for each of the identified black-only pixels, identifying at least one black-only pixel as a candidate for adding color based at least in part on the location of the black-only pixel with respect to an edge in the halftoned bitmap, the identifying including:
        (i) determining whether the black-only pixel is within a first distance from an edge, and
        (ii) determining whether the black-only pixel is within a second distance from at least one color pixel, including:
            (iia) creating a window centered around the black-only pixel; and
            (iib) determining whether the window encompasses a pixel with an on value for cyan, magenta or yellow;
    modifying the halftoned bitmap by adding a color to at least one of the candidate black-only pixels based at least in part on at least one pre-determined pattern; and
    outputting the modified halftoned bitmap, wherein the method is performed using a computer.

7. The method of claim 6, wherein the size of the window is determined based at least in part on an amount of coverage color previously added to the pixels in the halftoned bitmap.

8. A computer-based system for enhancing black density of a halftoned bitmap, comprising:
    a computer processor;
    computer memory which stores:
        an edge detection module,
        a neighboring color pixel detection module, and
        a pixel coloring module;
    wherein the edge detection module is operative to:
        receive a halftoned bitmap; and
        for each of a plurality of black-only pixels in the halftoned bitmap, determine whether the black-only pixel is within a first distance from an edge within the halftoned bitmap by performing actions comprising:
            creating a window centered around the black-only pixel wherein the size of the window created is determined based at least in part on a degree of misregistration; and determining whether the window encompasses a pixel with an off value for black;

wherein the neighboring color pixel detection module is operative to:

for each of a plurality of black-only pixels in the halftoned bitmap, determine whether the black-only pixel is within a second distance from at least one color pixel in the halftoned bitmap; and wherein the pixel coloring module is operative to:

determine whether to add color to at least one black-only pixel based at least in part on the determinations from the edge detection module and neighboring color pixel detection module;

modify the halftoned bitmap by adding color to the black-only pixels based on the determination made by the pixel coloring module; and output the modified halftoned bitmap.

9. The computer-based system of claim 8, wherein the halftoned bitmap utilizes primary colors consisting of cyan, magenta, yellow and black (CMYK); and wherein each primary color of the halftoned bitmap is represented as an individual bitmap in which each primary color may be on or off for each pixel of the halftoned bitmap.

10. The computer-based system of claim 8, wherein the first and second distances used by the edge detection module and neighboring color pixel detection module, respectively, are equal.

11. The computer-based system of claim 8, wherein the neighboring color pixel detection module determines whether the black-only pixel is within a second distance from at least one color pixel in the halftoned bitmap by performing actions comprising:

creating a window centered around the black-only pixel; and determining whether the window encompasses a pixel with an on value for cyan, magenta or yellow.

12. The computer-based system of claim 11, wherein the size of the window created by the neighboring color pixel detection module is determined based at least in part on an amount of coverage color previously added to the pixels in the halftoned bitmap.

* * * * *